(12) United States Patent
Domenighi et al.

(10) Patent No.: US 10,717,214 B2
(45) Date of Patent: Jul. 21, 2020

(54) NOZZLE TIP AND METHOD FOR FILLING HONEYCOMB PANEL FOR REINFORCEMENT

(71) Applicant: 3M INNOVATIVE PROPERTIES COMPANY, St. Paul, MN (US)

(72) Inventors: Alvaro S. Domenighi, St. Paul, MN (US); Kim L. Gustafson, Lake Stevens, WA (US); Patrick G. Zimmerman, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 276 days.

(21) Appl. No.: 15/548,646

(22) PCT Filed: Mar. 4, 2016

(86) PCT No.: PCT/US2016/020810
§ 371 (c)(1),
(2) Date: Aug. 3, 2017

(87) PCT Pub. No.: WO2016/148938
PCT Pub. Date: Sep. 22, 2016

(65) Prior Publication Data
US 2018/0015646 A1    Jan. 18, 2018

Related U.S. Application Data

(60) Provisional application No. 62/132,877, filed on Mar. 13, 2015.

(51) Int. Cl.
*B29C 44/18* (2006.01)
*B05C 17/005* (2006.01)
(Continued)

(52) U.S. Cl.
CPC ...... *B29C 44/186* (2013.01); *B05C 17/00516* (2013.01); *B29C 39/02* (2013.01); *B29L 2031/60* (2013.01); *B29L 2031/608* (2013.01)

(58) Field of Classification Search
CPC . B29C 44/186; B29C 39/02; B05C 17/00516; B29L 2031/608
(Continued)

(56) References Cited

U.S. PATENT DOCUMENTS 3,807,351 A    4/1974  Tuberman
3,900,954 A *  8/1975  Dragan ............ B05C 17/00593
                                              433/90
(Continued)

FOREIGN PATENT DOCUMENTS

CA    2254295      5/2000
DE    20319881     4/2004
(Continued)

OTHER PUBLICATIONS

International Search Report for PCT International Application No. PCT/US2016/020810, dated May 24, 2016, 4pgs.

*Primary Examiner* — Joseph S Del Sole
*Assistant Examiner* — Lawrence D Hohenbrink, Jr.
(74) *Attorney, Agent, or Firm* — Philip P. Soo

(57) ABSTRACT

Nozzles are presented, for application of a setting resin into cells of a honeycomb core to provide the panel with reinforced segments. The nozzle comprises a connector portion and an application head, where the connector portion is adapted to receive setting resin from a resin dispensing device and deliver the setting resin to the application head, and the application head comprises: an exit hole, and a flange surrounding the exit hole. The flange comprises a bottom surface which comprises a planar surface which planar surface has a minimum width around the exit hole.

(Continued)

The bottom surface of flange curves upward at its outer perimeter. In some embodiments, the nozzle is optically translucent or transparent. In addition, methods of applying a setting resin into cells of a honeycomb core to form a honeycomb core reinforcement are presented. In some embodiments, the setting resin is a low density void filler.

10 Claims, 2 Drawing Sheets

(51) Int. Cl.
*B29C 39/02* (2006.01)
*B29L 31/60* (2006.01)

(58) Field of Classification Search
USPC .......................................................... 264/299
See application file for complete search history.

(56) References Cited

U.S. PATENT DOCUMENTS

| | | |
|---|---|---|
| 4,378,170 A | 3/1983 | Orr |
| 5,017,113 A | 5/1991 | Heaton |
| 5,250,145 A | 10/1993 | Despins |
| 6,276,858 B1* | 8/2001 | Kennedy ........... B05C 17/00516 401/193 |
| 2005/0100386 A1* | 5/2005 | Murray .................. C22C 23/02 401/5 |
| 2009/0294489 A1 | 12/2009 | Keohan |
| 2012/0091172 A1 | 4/2012 | Maier |

FOREIGN PATENT DOCUMENTS

| | | | | |
|---|---|---|---|---|
| EP | 0250129 | 12/1987 | | |
| EP | 2896463 | 7/2015 | | |
| GB | 1026463 | 4/1966 | | |
| GB | 2352989 | 2/2001 | | |
| GB | 2352989 A * | 2/2001 | ....... | B05C 17/00516 |
| WO | WO 1984-04262 | 11/1984 | | |
| WO | WO 2007-028857 | 3/2007 | | |
| WO | WO 2009-009840 | 1/2009 | | |
| WO | WO 2016-148937 | 9/2016 | | |
| WO | WO 2016-148991 | 9/2016 | | |

* cited by examiner

NOZZLE TIP AND METHOD FOR FILLING HONEYCOMB PANEL FOR REINFORCEMENT

CROSS REFERENCE TO RELATED APPLICATIONS

This application is a national stage filing under 35 U.S.C. 371 of PCT/US2016/020810, filed Mar. 4, 2016, which claims the benefit of U.S. Provisional Patent Application No. 62/132,877, filed Mar. 13, 2015, the disclosures of which are incorporated by reference in their entirety herein.

FIELD OF THE DISCLOSURE

This disclosure relates to nozzles for dispensing setting resins into a honeycomb core for use in a honeycomb panel to provide the panel with reinforced segments and methods of dispensing setting resins into a honeycomb core for use in a honeycomb panel to provide the panel with reinforced segments.

BACKGROUND OF THE DISCLOSURE

The following references may be relevant to the general field of technology of the present disclosure: U.S. Pat. Nos. 5,250,145, 6,276,858, US2009/0294489 A1, and US2012/0091172 A1.

SUMMARY OF THE DISCLOSURE

Briefly, the present disclosure provides nozzles for application of a setting resin into cells of a honeycomb core to provide the panel with reinforced segments. The nozzle comprises a connector portion and an application head, where the connector portion is adapted to receive setting resin from a resin dispensing device and deliver the setting resin to the application head, and the application head comprises: a) an exit hole, and b) a flange surrounding the exit hole. The flange comprises a bottom surface which comprises a planar surface which planar surface has a minimum width of greater than 0.5 cm around the entirety of the exit hole, in some embodiments greater than 0.6 cm, in some embodiments greater than 0.7 cm, in some embodiments greater than 0.8 cm, in some embodiments greater than 0.9 cm, in some embodiments greater than 1.0 cm, in some embodiments greater than 1.1 cm, and in some embodiments greater than 1.2 cm. The bottom surface of flange curves upward at its outer perimeter. In some embodiments, the exit hole has a maximum diameter of at least 1.5 cm. In some embodiments, the flange has an outer perimeter which has a maximum diameter of not more than 10 cm; in other embodiments not more than 8.0 cm; and in other embodiments not more than 5.0 cm. In some embodiments, the nozzle is a one-piece, integrally formed article. In some embodiments, the nozzle is optically translucent or transparent.

In another aspect, the present disclosure provides methods of applying a setting resin into cells of a honeycomb core to form a honeycomb core reinforcement, comprising the steps of: a) bringing the connector portion of a nozzle according to the present disclosure into connection with an output of a resin dispensing device; b) bringing the flange of the nozzle into contact with the surface of a honeycomb core; and c) dispensing the setting resin through the nozzle to the cells of the honeycomb core. In some embodiments, the setting resin is an adhesive. In some embodiments, the setting resin is a low density void filler.

DETAILED DESCRIPTION

This disclosure relates to nozzles for dispensing setting resins into a honeycomb core for use in a honeycomb panel to provide the panel with reinforced segments and methods of dispensing setting resins into a honeycomb core for use in a honeycomb panel to provide the panel with reinforced segments.

Any suitable honeycomb panels may be used in the practice of the present disclosure. Typically, the panel comprises a top surface layer, at least one core layer, and a bottom surface layer. In some embodiments, the panel is a honeycomb panel comprising a core layer of honeycomb support material. The honeycomb support material may be of any suitable geometry or material, including standard honeycomb and overexpanded honeycomb. Suitable materials may include metal or alloys, paper or card, plastic resins, fiber, or combinations thereof such as fiberglass or NOMEX® aramid resin-treated paper. The surface layers may be single layers or may be comprised of two or more plies. The surface layers may be of any suitable material, which may include one or more of aluminum or other metals or alloys, plastic resins, such as phenolic resin, optionally incorporating glass fibers, aramid fabrics such as KEVLAR®, paper, resin, or veneer.

In some embodiments, segments of a honeycomb panel are reinforced. Such reinforces panel segments may include segments which will bear hardware such as hinges, latches, and the like; segments which will be cut with through-holes, segments which will receive connectors of any sort, and the like. In some embodiments, honeycomb core is reinforced in certain segments before application of surface layers. In some embodiments, one or both surface layers are removed, temporarily or permanently, partially or completely, to allow reinforcement of segments.

Figure 3:
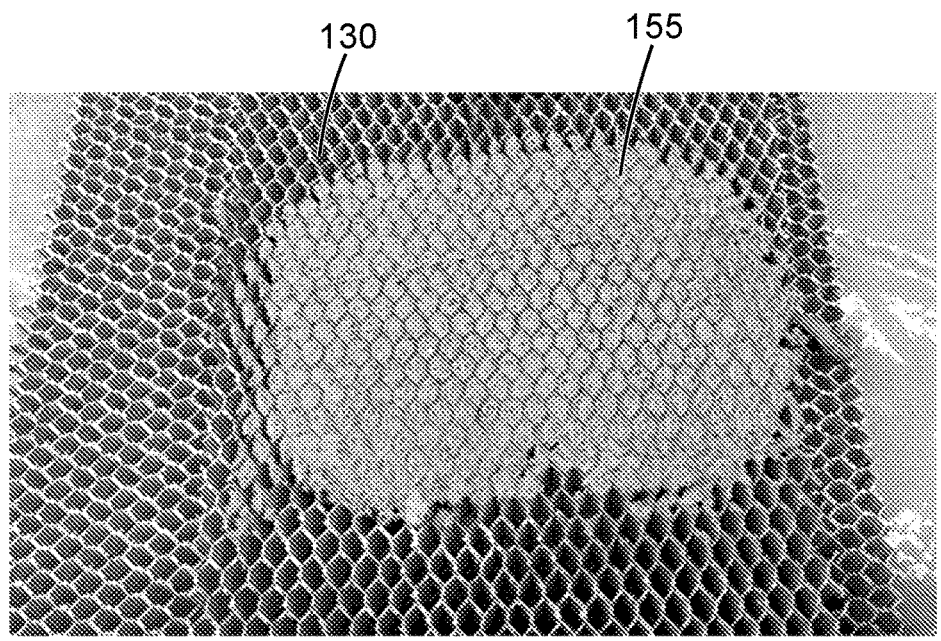
FIG. 3 is a photograph of a honeycomb core, which contains low density void filler within a number of cells that was applied from a nozzle according to the present disclosure, by a method according to the present disclosure, to form reinforcement in the honeycomb core.

FIG. 3 is a photograph of a honeycomb core 130. A setting resin, in this case a low density void filling resin, has been applied to cells of honeycomb core 130 using a nozzle and method of the present disclosure. The resin was allowed to cure in place to form reinforcement 155.

Any suitable setting resins may be used in the practice of the present disclosure. Suitable materials may include adhesives, including one-part or two-part adhesives, and void filler materials, including low density void fillers.

Figure 1A:
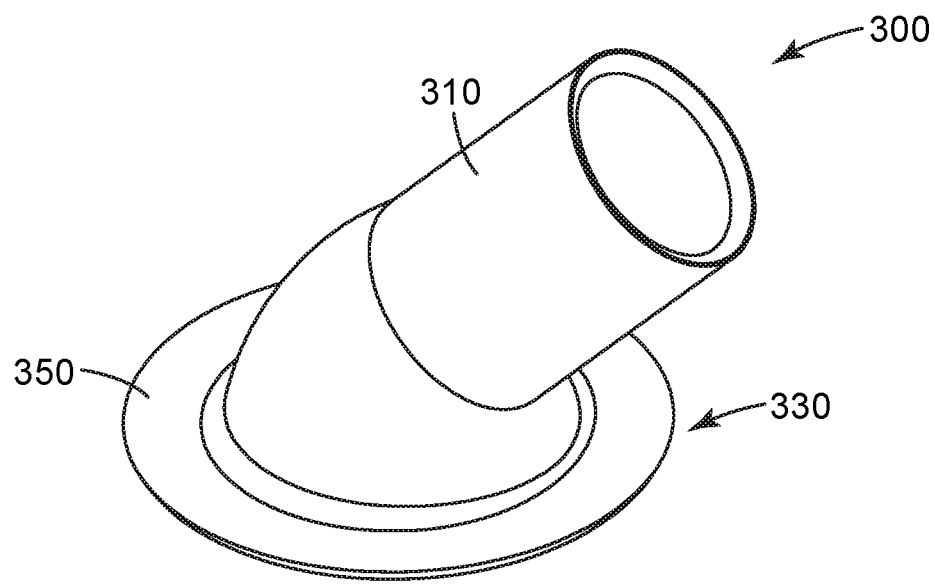
FIGS. 1A and 1B are views of an embodiment of a nozzle according to the present disclosure.
Figure 1B:
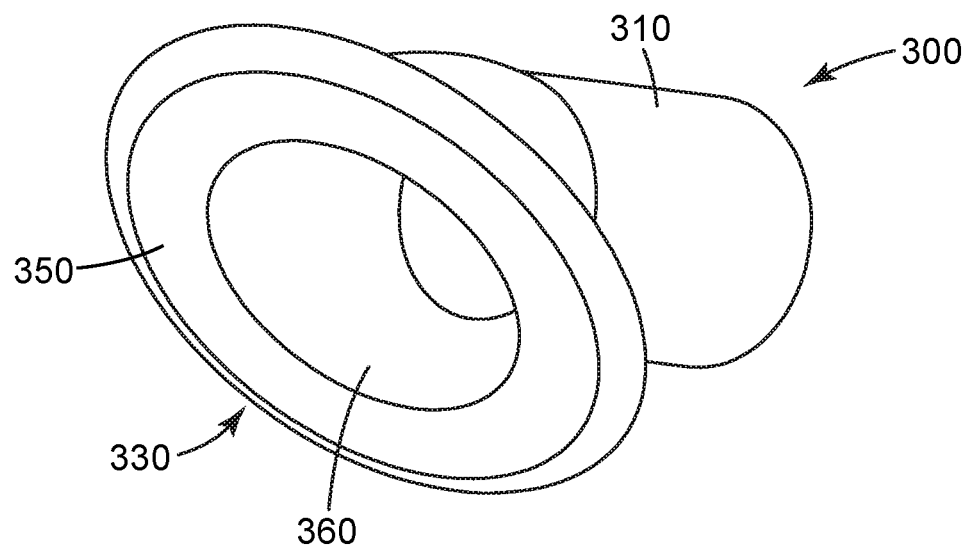
Figure 2:
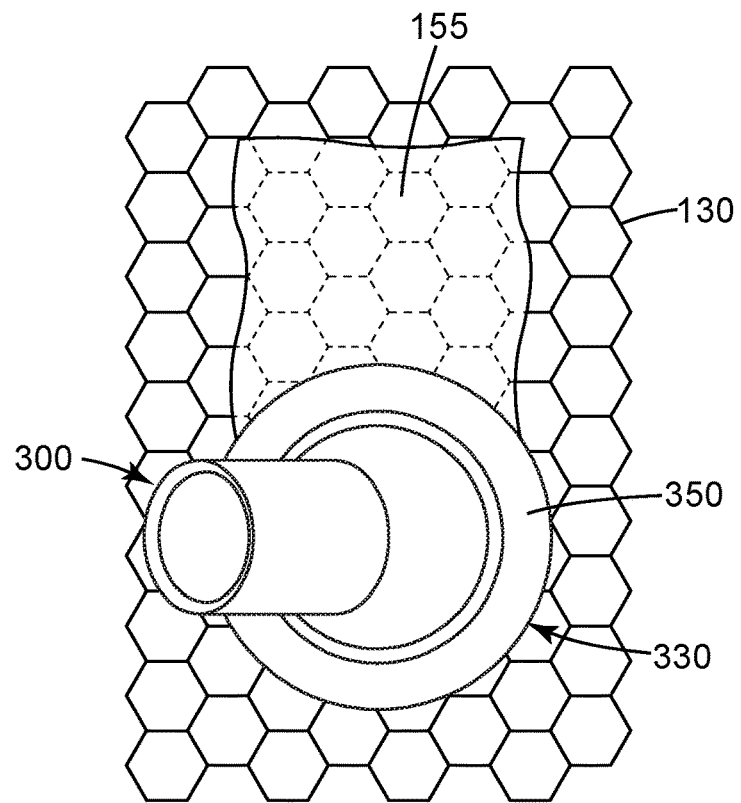
FIG. 2 is a view of an embodiment of a nozzle according to the present disclosure positioned for use with a honeycomb core.

FIG. 1A, FIG. 1B and FIG. 2 depict certain embodiments of nozzles 300 according to the present disclosure. The "vertical axis," as used herein, is the axis orthogonal to the top of the panel core when the nozzle is positioned next to the panel core for use, as depicted in FIG. 2.

With reference to FIG. 1A, FIG. 1B, and FIG. 2, nozzles 300 according to the present disclosure comprise connector portion 310 adapted to engage with a setting resin dispensing apparatus (not shown) so as to receive setting resin (not shown). Connector portion 310 may be adapted to engage any suitable setting resin dispensing apparatus. Suitable setting resin dispensing apparatus may include the output of a pump, tube, or gun, or the output of a mixing head. In some embodiments, the mixing head has an outer diameter of 10 or 13 mm, and thus connector portion 310 may have an inner diameter of 10 or 13 mm adapted for friction fit to such an apparatus. In some embodiments, the mixing head has a polygonal profile, and thus connector portion 210 may have a corresponding polygonal profile. In various embodiments, connector portion 310 may be adapted to engage a setting resin dispensing apparatus by friction fit, threaded connection, bayonet mount, or similar mechanism.

Application head 330 comprises exit hole 360 and flange 350. Setting resin (not shown) received in connector portion 310 may be applied from exit hole 360 to honeycomb core 130 to form reinforcement 155.

Connector portion 310 may engage application head 330 at any suitable angle. In some embodiments, such as depicted in FIG. 1A, FIG. 1B, and FIG. 2, connector portion 310 may engage application head 330 at approximately 45 degrees from vertical (relative to the vertical axis) and 45 degrees from lateral (relative to the lateral axis). In some embodiments, connector portion 310 may engage application head 330 vertically, i.e., at approximately 0 degrees from vertical. In some embodiments adapted to hand application, connector portion 310 engages application head 330 at angles of from 15 degrees to 75 degrees from vertical. In some embodiments adapted to automated application, connector portion 310 engages application head 330 at angles of from 0 degrees to 15 degrees from vertical.

Application head 330 comprises flange 350 surrounding exit hole 360. Flange 350 comprises a bottom surface which comprises a portion that is a planar surface orthogonal to the vertical axis, which planar portion has a minimum width of greater than 0.5 cm around the entirety of exit hole 360. In some embodiments, the minimum width is greater than 0.6 cm, in some embodiments greater than 0.7 cm, in some embodiments greater than 0.8 cm, in some embodiments greater than 0.9 cm, in some embodiments greater than 1.0 cm, in some embodiments greater than 1.1 cm, in some embodiments greater than 1.2 cm. At its outer perimeter, the bottom surface of flange 350 curves upward, away from the top of the panel core when the nozzle is positioned next to the panel core for use.

In some embodiments, such as depicted in FIG. 1A, FIG. 1B, and FIG. 2, exit hole 360 is essentially circular. In some embodiments, exit hole 360 is essentially elliptical. In some embodiments, exit hole 360 is hexagonal. In other embodiments, 360 is any suitable regular polygon. In other embodiments, 360 is any suitable polygon. In other embodiments, 360 is any suitable simple closed curve. In some embodiments, exit hole 360 has a maximum diameter of at least 1.5 cm. In some embodiments, exit hole 360 has a maximum diameter of not more than 5 cm. In some embodiments, exit hole 360 has a maximum diameter of not more than 4 cm. In some embodiments, exit hole 360 has a maximum diameter of not more than 3 cm. In some embodiments, exit hole 360 has a minimum diameter of at least 1.0 cm. In some embodiments, exit hole 360 has a minimum diameter of at least 1.5 cm.

In some embodiments, such as depicted in FIG. 1A, FIG. 1B, and FIG. 2, the outer perimeter of flange 350 is essentially circular. In some embodiments, the outer perimeter of flange 350 is essentially elliptical. In some embodiments, the outer perimeter of flange 350 is hexagonal. In other embodiments, the outer perimeter of flange 350 is any suitable regular polygon. In other embodiments, the outer perimeter of flange 350 is any suitable simple closed curve. In some embodiments, the outer perimeter of flange 350 has a maximum diameter of at least 3.0 cm. In some embodiments, the outer perimeter of flange 350 has a maximum diameter of not more than 10 cm. In some embodiments, the outer perimeter of flange 350 has a maximum diameter of not more than 8 cm. In some embodiments, the outer perimeter of flange 350 has a maximum diameter of not more than 5 cm. In some embodiments, the outer perimeter of flange 350 has a minimum diameter of at least 3.0 cm.

The nozzles according to the present disclosure may be made of any suitable material. Suitable materials may include ceramics, metals or plastic resins, such resins potentially including ABS, acrylics, polyetheramides such as ULTEM™, and optionally incorporating fibers or fillers. In some embodiments the nozzle material is optically clear or translucent so as to allow observation of the setting resin within the nozzle during preparation, use, and cleaning. The nozzles according to the present disclosure may be made by any suitable process. Suitable processes may include machining, additive processes such as 3D printing, molding processes such as injection molding. In some embodiments, the nozzles according to the present disclosure are one-piece, integrally formed articles. In some embodiments, the nozzles according to the present disclosure are integrally formed with or permanently attached to setting resin dispensing apparatus.

With reference to FIG. 2, in a method according to the present disclosure, connector portion 310 of a nozzle 300 according to the present disclosure is brought into connection with the output of a resin dispensing device (not shown). Application head 330 of nozzle 300 is brought into contact with the surface of honeycomb core 130 such that flange 350 is plane parallel to and rides on honeycomb core 130. Setting resin (not shown) is dispensed from the resin dispensing device through nozzle 300 to cells of honeycomb core 130 and forced into cells of honeycomb core 130 to form reinforcement 155. In some embodiments, masking tape is applied to the surface of honeycomb core 130 to define the perimeter of the reinforced area. Nozzle 300 may be moved across the surface of honeycomb core 130 to enlarge the area of reinforcement. It is to be understood that motion of the nozzle relative to the panel may be achieved by motion of the nozzle, motion of the panel, or both. The setting resin is allowed or caused to set. Dispensing of the resin may be motivated by any suitable method, including manual and mechanical methods, and controlled by any suitable methods, including human or automated methods. Support and motion of the panel and nozzle may be accomplished by any suitable methods, including manual and mechanical methods, and controlled by any suitable methods, including human or automated methods.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A nozzle for application of a setting resin into cells of a honeycomb core, the nozzle comprising a connector portion and an application head, wherein the connector portion is adapted to receive setting resin from a resin dispensing device and deliver the setting resin to the application head, and wherein the application head comprises:

a) an exit hole, and b) a flange surrounding the exit hole, wherein the flange comprises a bottom surface which comprises a planar surface that surrounds the exit hole, which planar surface has a minimum width of greater than 0.5 cm around the entirety of the exit hole and wherein the bottom surface of the flange further comprises a section that faces towards the honeycomb core while bending upward at an outer perimeter of the flange, away from the top of the honeycomb core when the nozzle is positioned next to the honeycomb core for use.

2. The nozzle according to claim 1 wherein the exit hole has a maximum diameter of at least 1.5 cm and the outer perimeter of the flange has a maximum diameter of not more than 10 cm.

3. The nozzle according to claim 1 wherein the planar surface has a minimum width of greater than 0.8 cm around the entirety of the exit hole.

4. The nozzle according to claim 1 wherein the outer perimeter of the flange has a maximum diameter of not more than 5.0 cm.

5. The nozzle according to claim 1 which is a one-piece, integrally formed article.

6. The nozzle according to claim 1 which is optically translucent or transparent.

7. A method of applying a setting resin into cells of the honeycomb core to form a honeycomb core reinforcement, comprising the steps of:

a) bringing the connector portion of the nozzle according to claim 1 into connection with an output of the resin dispensing device;

b) bringing the flange of said nozzle into contact with the surface of the honeycomb core; and c) dispensing the setting resin through the nozzle to the cells of the honeycomb core.

8. The method according to claim 7 wherein the setting resin is an adhesive.

9. The method according to claim 7 wherein the setting resin is a void filler.

10. The nozzle according to claim 1, wherein the bottom surface of the flange curves upward along the entire outer perimeter of the flange.

* * * * *